(12) United States Patent
Murakami

(10) Patent No.: US 8,743,276 B2
(45) Date of Patent: Jun. 3, 2014

(54) OPENING/CLOSING DOOR LOCKING DEVICE FOR AN ELECTRONIC DEVICE

(75) Inventor: Tomohiro Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 363 days.

(21) Appl. No.: 12/693,550

(22) Filed: Jan. 26, 2010

(65) Prior Publication Data

US 2010/0194975 A1    Aug. 5, 2010

(30) Foreign Application Priority Data

Jan. 28, 2009   (JP) ................................. 2009-016186
Jan. 22, 2010   (JP) ................................. 2010-011532

(51) Int. Cl.
*H04N 5/225*   (2006.01)
*H04N 9/47*    (2006.01)

(52) U.S. Cl.
USPC .......................................... 348/373; 348/81

(58) Field of Classification Search
USPC .................... 348/373–373, 81, 374, 376, 375
See application file for complete search history.

(56) References Cited

U.S. PATENT DOCUMENTS

| | | | | |
|---|---|---|---|---|
| 5,270,702 A | * | 12/1993 | Krolak | 340/7.63 |
| 5,907,721 A | * | 5/1999 | Schelling et al. | 396/27 |
| 6,490,411 B1 | * | 12/2002 | Mazzacani et al. | 396/6 |
| 7,403,706 B2 | * | 7/2008 | Nakao et al. | 396/176 |
| 7,409,148 B2 | * | 8/2008 | Takahashi et al. | 396/29 |
| 7,824,792 B2 | * | 11/2010 | Shi | 429/96 |

FOREIGN PATENT DOCUMENTS

| | | |
|---|---|---|
| JP | 60-156482 U | 10/1985 |
| JP | 61-221734 | 10/1986 |
| JP | 01-081641 U | 5/1989 |
| JP | 2001-003607 | 1/2001 |
| JP | 2001-021979 | 1/2001 |
| JP | 2002-227464 | 8/2002 |
| JP | 3113276 U | 7/2005 |

* cited by examiner

*Primary Examiner* — Ahmed A Berhan
(74) *Attorney, Agent, or Firm* — Hamre, Schumann, Mueller & Larson, P.C.

(57) ABSTRACT

An opening/closing door 10 for openably closing the opening of a housing includes: a door body; a locking member for holding the door body in a closed state by engagement with a part of the housing; and a lever 11 that is linked with the locking member and has one end rotatably supported by the door body, the door body including: a storage part 24 for storing the lever 11 along the surface of the door body when the locking member is placed in a locking state completely; and a protrusion 12 that protrudes outside the storage part 24 and comes into contact with the lever 11 when the locking member 13 is placed in the locking state incompletely.

6 Claims, 5 Drawing Sheets

OPENING/CLOSING DOOR LOCKING DEVICE FOR AN ELECTRONIC DEVICE

FIELD OF THE INVENTION

The present invention relates to an opening/closing door locking device used for electronic equipment such as a video camera usable under water and the like, and particularly relates to an opening/closing door locking device that makes it possible to recognize whether an opening/closing door has been completely locked or not when electronic equipment is used under water.

BACKGROUND OF THE INVENTION

Some kinds of electronic equipment such as a video camera can be used under water and have opening/closing doors for storing recording media such as an SD memory card and batteries and connecting various electric terminals. Other kinds of electronic equipment such as a video camera have mechanisms for locking opening/closing doors after the opening/closing doors are closed, thereby preventing the ingress of water when the electronic equipment is used under water.

Japanese Patent Laid-Open No. 2001-21979 discloses a waterproof mechanism of electronic equipment. The mechanism can store multiple accessories such as a battery and a memory card in a storage part in the electronic equipment and has a waterproof lid for closing the storage part with watertightness, so that the storage part of the multiple accessories can be closed by the waterproof lid watertightly.

DISCLOSURE OF THE INVENTION

In the waterproof mechanism of the electronic equipment according to the prior art, a lock lever is rotated with the waterproof lid closed and a lock plate connected to the lock lever is rotated simultaneously to lock the waterproof lid. When the lock lever is not fully rotated and the waterproof lid is incompletely locked, it is not possible to keep the watertightness of the electronic equipment, resulting in a failure. However, a user cannot recognize whether the waterproof lid has been locked or not when operating the lock lever. Thus the user may erroneously believe that the waterproof lid would have been locked, though the waterproof lid has not been completely locked. In this case, the electronic equipment with the waterproof lid incompletely locked may allow the ingress of water into the storage part and the like, so that the electronic equipment may be damaged.

The present invention has been devised to solve the problem. An object of the present invention is to provide a waterproof mechanism for electronic equipment by which a user easily can recognize whether locking has been completed or not.

In order to solve the foregoing problem, the present invention is an opening/closing door locking device having an opening/closing door for openably closing the opening of a housing, the opening/closing door including: a door body capable of closing the opening; a locking member that can be engaged with a part of the housing and holds the door body in a closed state by engagement with the part of the housing; and a lever that is linked with the locking member, can switch the locking member between a locking state and an unlocking state, and has one end rotatably supported by the door body, the door body including: a storage part for storing the lever when the locking member is placed completely in the locking state; and a protrusion that protrudes outside the storage part and comes into contact with the lever when the locking member is incompletely placed in the locking state.

With this configuration, when the locking member is completely placed in the locking state, the lever is stored in the storage part provided along the surface of the door body. When the locking member is incompletely placed in the locking state, the lever linked with the locking member comes into contact with the protrusion of the door body and is placed in a different position from a storage position in the storage part. Thus by visually confirming the position of the lever, a user can recognize whether the opening/closing door has been completely locked or not.

Further, the protrusion of the present invention is formed around the storage part on the door body.

The door body of the present invention further includes an operation indication part that is placed behind the lever in a state in which the lever is stored in the storage part, and can be confirmed visually from the outside in a state in which the lever is pulled out, the operation indication part indicating the operation direction of the lever.

With this configuration, when the lever to be operated is pulled out, the operation indication part indicates the operation directions of the lever at a necessary time. Thus the user can easily recognize the rotation directions of the lever at a necessary time, for example, during locking and unlocking, thereby achieving high usability. When the operation of the lever is not necessary, the unwanted indication of the operation indication part becomes invisible and is not viewed from the outside, so that the appearance of electronic equipment including the opening/closing door locking device is not sacrificed.

The configuration of the electronic equipment of the present invention makes it possible to recognize whether the opening/closing door has been locked or not from a storage state of the lever. Thus it is possible to prevent the electronic equipment including the opening/closing door locking device from being damaged when the opening/closing door is locked incompletely.

DESCRIPTION OF THE EMBODIMENTS

First Embodiment

Figure 1:
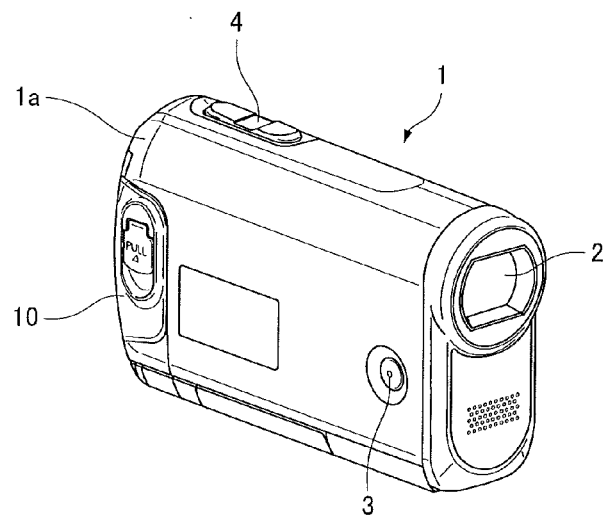
FIG. 1 is a general perspective view of a video camera according to an embodiment of the present invention.
Figure 2:
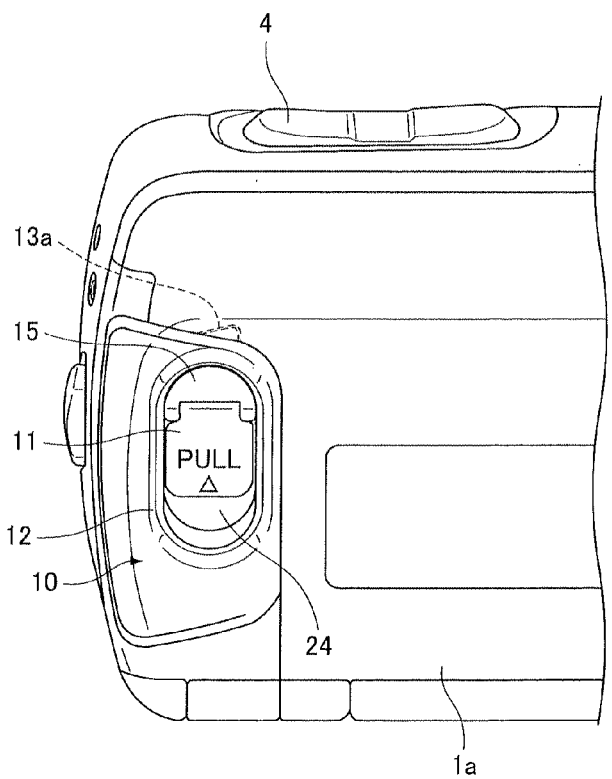
FIG. 2 is a front view showing the appearance of an opening/closing door according to the embodiment of the present invention.

The following will describe the case where an opening/closing door locking device according to a first embodiment of the present invention is used for a video camera that is an example of electronic equipment, with reference to the accompanying drawings. FIG. 1 is a general perspective view of a video camera 1 according to the first embodiment of the present invention. FIG. 2 is a side view showing the appearance of an opening/closing door provided on the video camera. In the following explanation, a front side indicates a side close to a subject when a user of the video camera 1 holds the video camera 1 and aims the video camera 1 at the subject. Further, the lateral direction of the video camera 1 is the same as the lateral direction of the user.

As shown in FIGS. 1 and 2, the video camera 1 has an imaging lens 2 at the front side. The body of the video camera 1 contains image pickup devices, a recording medium, and so on (not shown) and is configured to record and reproduce imaging information. On the left side of the video camera 1, a liquid crystal monitor (not shown) is disposed so as to open and close and can display a photographed image, a reproduced image, and so on. The video camera 1 has a recording button 3 and a zoom lever 4 that enable various operations for a user of the video camera 1. Recording is started and stopped and zooming is performed using the recording button 3 and the zoom lever 4.

Figure 3:
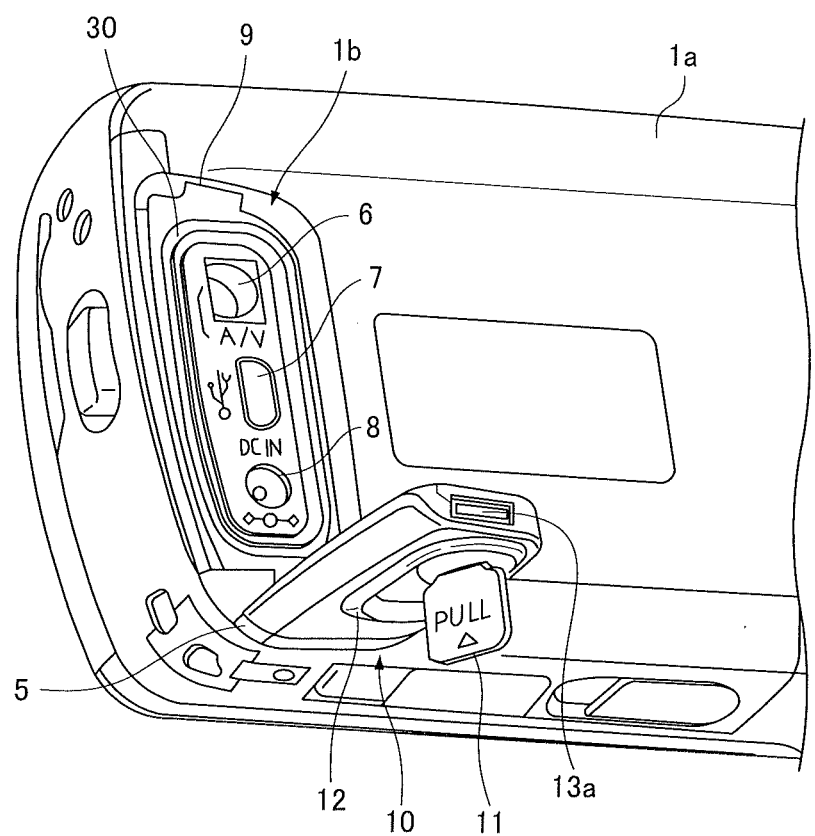
FIG. 3 is a perspective view showing the appearance of the video camera with the opening/closing door opened according to the embodiment of the present invention.

As shown in FIGS. 1 to 3, on the right side of the video camera 1, an opening/closing door 10 is provided that openably closes an opening 1b (see FIG. 3) formed on a housing 1a of the video camera 1. FIG. 3 is a perspective view showing the appearance of the video camera with the opening/closing door opened. The opening/closing door 10 has a locking mechanism for preventing the entrance of water from the opening 1b into the video camera 1 (the body of the video camera 1). When the user uses the video camera 1 under water and the like, photographing and so on are performed with the opening/closing door 10 locked in order to prevent the entrance of water into the video camera 1. As shown in FIG. 3, the opening/closing door 10 is supported by a bearing 5 provided at the lower portion of the opening/closing door 10 so that the opening/closing door 10 can open and close via a shaft 21 (see FIG. 4A and so on) assembled into the housing 1a of the video camera 1. Further, the opening/closing door 10 can open so as to pivot to the lower right about the shaft 21. The video camera 1 includes an AV terminal 6 for receiving and outputting an AV signal to and from an external device, a USB terminal 7 for USB connection to an external device, and an AC adaptor terminal 8 for connecting an AC adaptor, at points facing the opening 1b opened and closed by the opening/closing door 10. These connecting terminals are not used in normal photographing. After the completion of photographing, these connecting terminals are connected to receive and output a photographing image signal and the like to and from external equipment in normal use conditions.

Figure 4A:
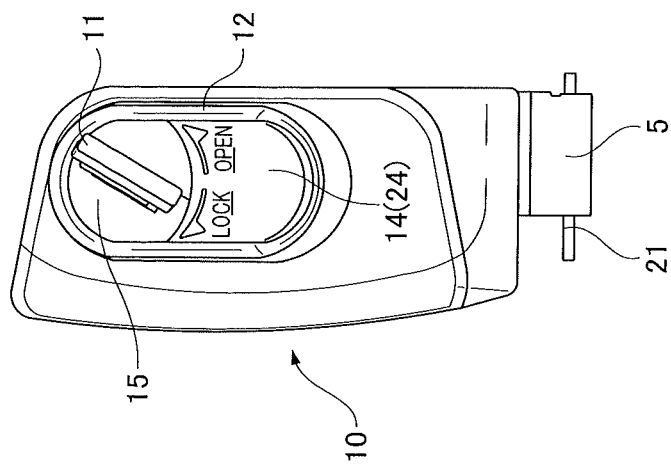
FIG. 4A shows a change of the shape of the opening/closing door during opening and closing operations in a state in which a lever is stored in a storage part according to the embodiment of the present invention.
Figure 4B:
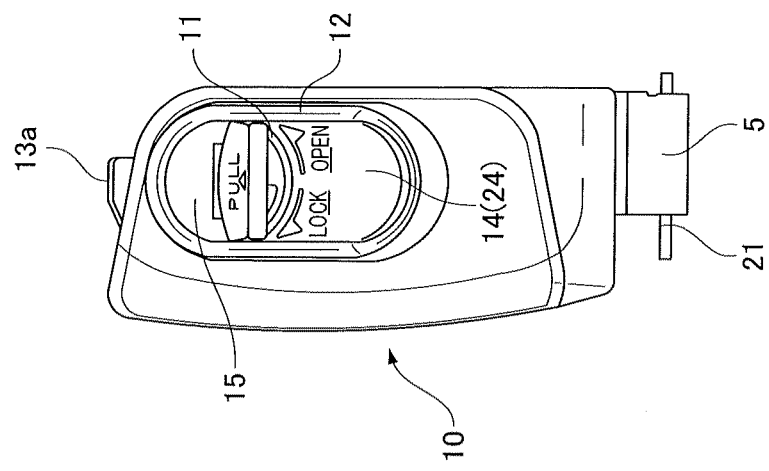
FIG. 4B shows a change of the shape of the opening/closing door during opening and closing operations in a state in which the lever is raised according to the embodiment of the present invention.
Figure 4C:
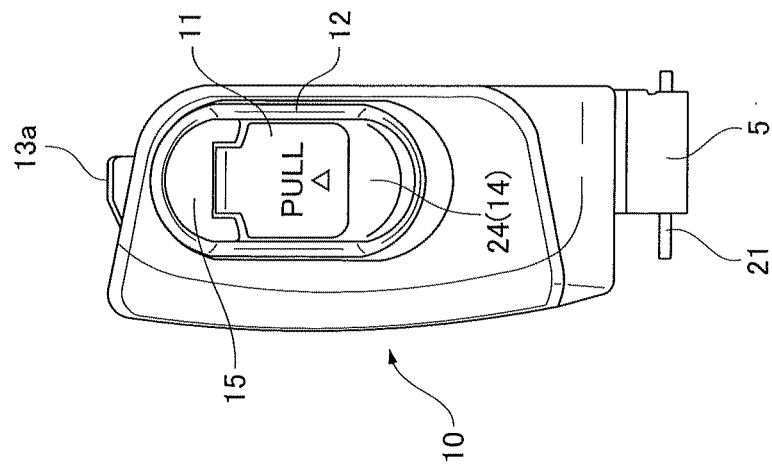
FIG. 4C shows a change of the shape of the opening/closing door during opening and closing operations in a state in which the lever 11 is rotated in an opening direction according to the embodiment of the present invention.
Figure 5:
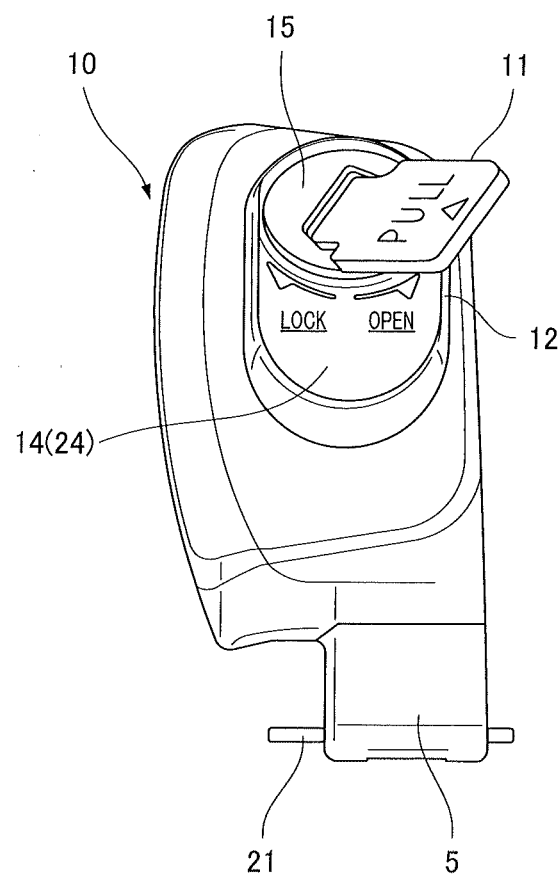
FIG. 5 shows the appearance of the unlocked opening/closing door according to the embodiment of the present invention.
Figure 6:
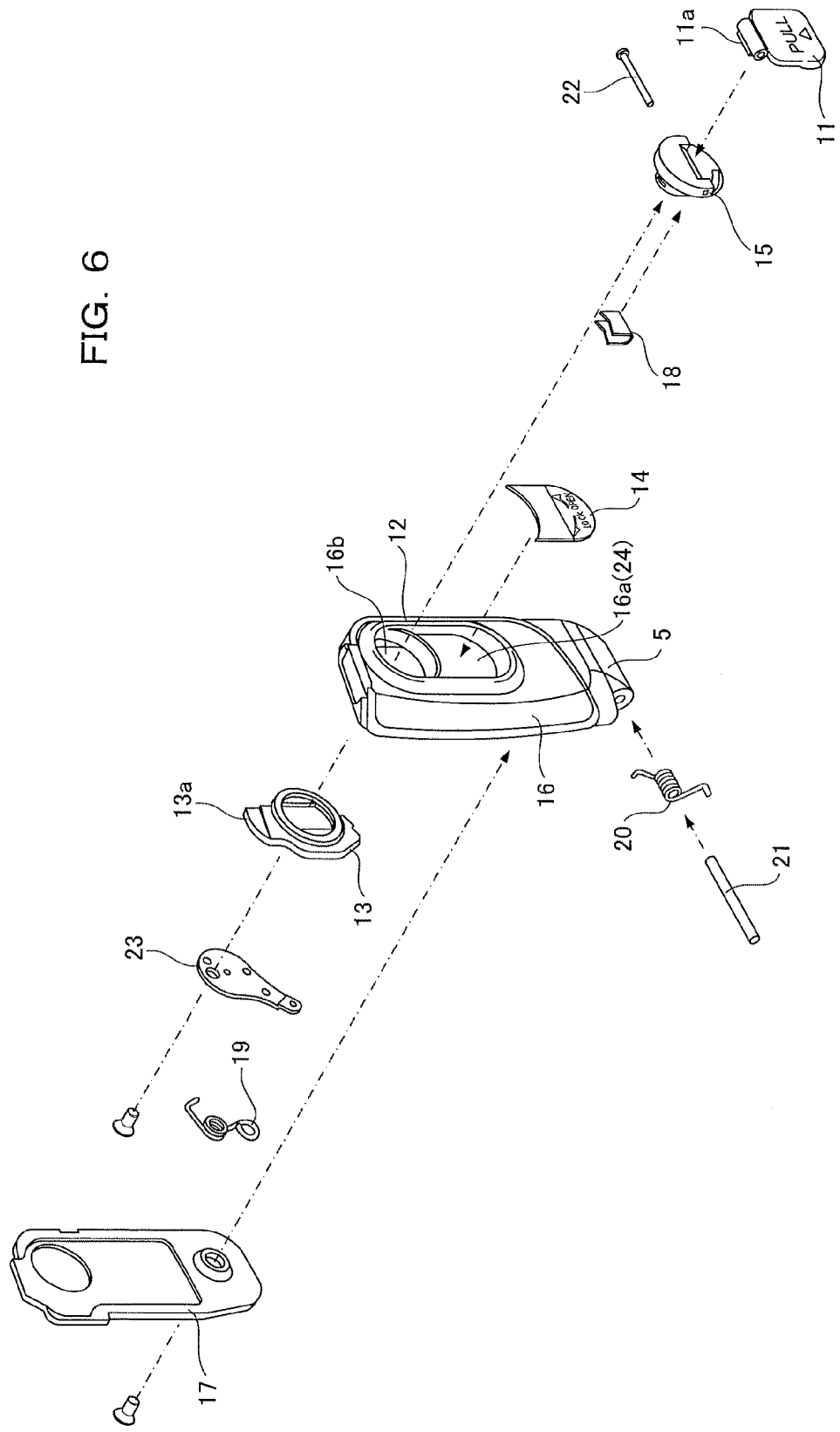
FIG. 6 is an exploded perspective view showing members constituting the opening/closing door according to the embodiment of the present invention.

Referring to FIGS. 4A, 4B, 4C, 5, 6, and so on, the following will specifically describe the opening/closing door 10 for opening and closing the opening 1b of the housing 1a of the video camera 1. FIGS. 4A, 4B, and 4C show changes of the shape of the opening/closing door during opening and closing operations by the user. FIG. 5 shows the appearance of the unlocked opening/closing door. FIG. 6 is an exploded perspective view of the opening/closing door.

As shown in FIGS. 4A, 4B, 4C, 5, and 6, the opening/closing door 10 has a lever 11 that can rotate in a raised position (pulled out) and a locking member 13 operating in synchronization with a rotation of the lever 11. In a locking state, as indicated by a dotted part of FIG. 2 and shown in FIG. 4A, a locking protrusion 13a formed on the locking member 13 protrudes in engagement with a recessed engaged portion 9 that is provided on the housing 1a so as to face the opening 1b of the video camera 1. On the outer surface of the opening/closing door 10, a protrusion 12 protruding outward is formed (in the first embodiment, the protrusion 12 is formed of semicircles connected via straight lines but the shape of the protrusion 12 is not particularly limited) around the shape of the lever 11 (the width of the stored lever 11 in the present embodiment). Further, a range (region) surrounded by the protrusion 12 is used as a storage part 24 for storing the lever 11. In the first embodiment, the storage part 24 is formed along the surface of the opening/closing door 10, whereas the protrusion 12 is formed to protrude outward from the surface where the storage part 24 of the lever 11 is provided. FIG. 4A shows a state in which the lever 11 is stored in the storage part 24, and FIG. 4B shows a state in which the lever 11 is raised.

As shown in FIG. 6, the opening/closing door 10 includes the lever 11, a lever support member 15 for pivotally supporting the lever 11 via a shaft 22 such that the lever 11 is supported in a storage position to be stored in the storage part 24 and in a raised position to be raised outward, an opening/closing door outer member 16 that constitutes the outer surface of the opening/closing door 10 and has a hole 16b for inserting the lever support member 15, the protrusion 12 formed around the storage part 24 of the lever 11, an operation method guide member 14 that is bonded to a recessed portion 16a constituting the storage part 24 on the opening/closing door outer member 16 and serves as an operation indication part indicating the rotation direction and the like of the lever 11, a lever spring 18 for urging the lever 11 to the storage position or the raised position, the locking member 13 that has the locking protrusion 13a and is fixed to the lever support member 15 through the hole 16b of the opening/closing door outer member 16, a toggle spring 19 that is engaged with an auxiliary member 23 and the like assembled into the locking member 13 and always urges the lever support member 15 and the locking member 13 in any direction so as to hold the locking member 13 selectively in a locking position or an opening position, and an opening/closing door inner member 17 that constitutes the opening/closing door 10 with the opening/closing door outer member 16 and stores members including the locking member 13 in the opening/closing door 10. The opening/closing door outer member 16 and the opening/closing door inner member 17 constitute a door body that can close the opening 1b of the housing 1a of the video camera 1.

As shown in FIGS. 2 and 4A, the outer surface of the stored lever 11 has letters "PULL" indicating that the lever 11 can be raised. The operation method guide member 14 is disposed inside (behind) the lever 11 (specifically, at a position inside the lever 11 stored in the storage part 24) on the opening/closing door 10. As shown in FIGS. 4B and 4C, the operation method guide member 14 has letters "OPEN" and "LOCK" with rotation directions to indicate the rotation directions of the raised lever 11. As shown in FIG. 4A and so on, the letters and directions are placed in a region that is hidden behind the lever 11 and cannot be recognized by the user when the lever 11 is placed in the storage position. Only when the lever 11 is pulled out into the raised position (see FIGS. 4B and 4C) or the lever 11 is stored in an imperfect position (see FIG. 5), the indication (the letters "OPEN" and "LOCK" and the rotation directions) can be recognized.

The user rotates the lever 11 in a locking direction according to the indication of the operation method guide member 14, so that the opening/closing door 10 can be locked. The opening/closing door 10 can be opened by rotating the lever 11 in an opening (OPEN) direction.

The lever spring 18 shown in FIG. 6 is attached to the lever support member 15 so as to be in contact with a protrusion 11a formed on the lever 11. When the lever 11 is close to the storage position, the lever spring 18 urges the lever 11 to the storage position. When the lever 11 is close to the raised position, the lever spring 18 urges the lever 11 to the raised position.

The locking member 13 rotates with the lever 11 and the lever support member 15, and the locking protrusion 13a protrudes from the top of the opening/closing door outer member 16 along with a rotation of the locking member 13 in the "LOCK" direction. Thus when the lever 11 is fully rotated in the "LOCK" direction with the opening/closing door 10 completely closed, the locking protrusion 13a is engaged with the engaged portion 9 to lock the opening/closing door 10.

The opening/closing door inner member 17 is formed of a member having an elastic body integrated with a metallic part (the elastic body is provided on a side coming into contact with the contact surface of the opening/closing door 10). When the opening/closing door 10 is locked, the opening/closing door inner member 17 elastically comes into contact with the opposing surface of the opening/closing door 10 so as to cover the AV terminal 6, the USB terminal 7, and the AC adaptor terminal 8, thereby preventing the ingress of water from these terminals to the inside. As shown in FIG. 3, it is preferable to improve watertightness by forming a groove 30 around a region in which the AV terminal 6, the USB terminal 7, and the AC adaptor terminal 8 are provided on the body (or the housing 1a) of the video camera 1 and forming a loop protrusion on the opening/closing door inner member 17 so as to be fit into the groove 30 when the opening/closing door 10 is locked. The configuration is not particularly limited.

On the shaft 21 for rotatably supporting the opening/closing door outer member 16, an open spring 20 is fit with one end locked to the bearing 5 of the opening/closing door 10 and the other end locked to the housing 1a or the body of the video camera 1. The open spring 20 always urges the opening/closing door 10 in an opening direction. Thus even when the lever 11 is folded with the opening/closing door 10 slightly opened, the opening/closing door 10 with the locking protrusion 13a not engaged with the engaged portion 9 is automatically opened, so that an unlocking state is correctly recognized. Moreover, the automatic opening of the opening/closing door 10 facilitates an opening operation.

With this configuration, as shown in FIGS. 2 and 4A, when the opening/closing door 10 is closed and locked, the operation guide on the operation method guide member 14 is hidden behind the stored lever 11 and is not exposed on the appearance of the video camera 1, so that the appearance of the video camera 1 is not sacrificed.

When the user opens the locked opening/closing door 10 in FIG. 4A, the user can recognize only the letters "PULL" indicated on the lever 11 in a locking state. The user firstly raises the lever 11 in accordance with the indication of "PULL". By raising the lever 11, as shown in FIG. 4B, the operation guide on the operation method guide member 14 having been hidden behind the lever 11 can be visually confirmed. The user rotates the lever 11 in the opening (OPEN) direction in accordance with the operation guide on the operation method guide member 14. Thus as shown in FIG. 4C, the lever 11 rotated in the opening direction disengages the locking protrusion 13a that was engaged with the engaged portion 9 and the locking protrusion 13a is stored in the opening/closing door 10, so that the opening/closing door 10 is unlocked. Since the opening/closing door 10 is placed in an openable state, the opening/closing door 10 is opened by the urging force of the open spring 20.

In this way, when the user opens the opening/closing door 10, the operation guide on the operation method guide member 14 having been hidden behind the lever 11 can be visually confirmed by pulling out the lever 11 as shown in FIG. 4B. Thus the user easily can recognize the rotation direction of the lever 11 to perform an unlocking operation. The user thus can obtain necessary information at a proper time, achieving high usability. In other words, in the prior art not provided with the operation method guide member 14, the user cannot recognize in which direction the lever 11 should be rotated in an opening operation, whereas in the first embodiment, the operation method guide member 14 makes it possible to recognize easily the rotation direction of the lever 11 to perform an opening operation.

When the user closes and locks the opening/closing door 10, the operation guide ("LOCK") on the operation method guide member 14 can be confirmed visually as shown in FIG. 4B in a state in which the user simply closes the opening/closing door 10 from the opening state of FIG. 4C. Thus the user easily can recognize the rotation direction of the lever 11 to perform a locking operation. After that, the user rotates the lever 11 in the locking direction in accordance with the operation guide on the operation method guide member 14. Hence, as shown in FIG. 4C, the rotation of the lever 11 in the locking direction engages the locking protrusion 13a with the engaged portion 9, so that the opening/closing door 10 is locked. Also in the locking operation, the user can obtain necessary information at a proper time, achieving high usability.

In some cases, when the user rotates the lever 11 to lock the opening/closing door 10, the user may incompletely rotate the lever 11 at the end of a locking operation. FIG. 5 shows this state.

When the user uses the video camera 1 under water without completely locking the opening/closing door 10, water may enter the inside of the video camera 1 and cause a failure of the video camera 1. Thus it is necessary to lock the opening/closing door 10 completely for underwater use. In response to this need, in the first embodiment, the protrusion 12 is formed on the outer surface of the opening/closing door 10 so as to protrude outside the storage part 24 of the lever 11. When storing the lever 11 without completely rotating the lever 11 to the locking state as shown in FIG. 5, the drawn lever 11 is folded in contact with the protrusion 12 and protrudes outside the protrusion 12, so that the lever 11 cannot be stored in the storage part 24 provided inside the protrusion 12.

Therefore, from a storage state of the folded lever 11, the user can recognize whether the opening/closing door 10 has been completely locked or not. In other words, when the lever 11 is folded while the opening/closing door 10 is completely locked, the lever 11 is sufficiently stored in the storage part 24 inside the protrusion 12. By visually confirming this state, the user can recognize that the opening/closing door 10 has been completely locked. On the other hand, when the lever 11 is folded while the opening/closing door 10 is incompletely locked, the lever 11 comes into contact with the protrusion 12 and partially protrudes outside the protrusion 12. By visually confirming this state, the user can recognize easily that the opening/closing door 10 has been incompletely locked.

Further, when the lever 11 comes into contact with the protrusion 12 and cannot be stored in the storage part 24 inside the protrusion 12, the user can visually confirm the operation method guide member 14 that is not supposed to be viewed from the outside when the lever 11 is stored in the storage part 24 inside the protrusion 12. Also from this state, the user can more correctly recognize that the opening/closing door 10 has not been completely locked.

Therefore, in this case, the user rotates the lever 11 again to lock the opening/closing door 10 completely, thereby reliably preventing the entrance of water into the video camera 1 used under water. Thus when the opening/closing door 10 is not completely locked, the user can avoid the use of the video camera 1 under water.

Other Embodiments

The first embodiment was described as an example of the present invention. The present invention is not limited to the first embodiment. The following will collectively describe other embodiments of the present invention.

In the first embodiment of the present invention, the lever 11 is pivotally supported perpendicularly to the rotation axis of the lever support member 15 and the lever 11 is raised by a rotation. The present invention is not limited to this configuration. In other words, other configurations may be used as long as the protrusion 12 is provided around the storage part 24 according to the shape of the lever 11 and the lever 11 cannot be stored in a state in which the locking protrusion 13a is not completely engaged with the engaged portion 9 (incomplete locking) while the opening/closing door 10 is being closed. For example, the overall lever 11 may slide outward beyond the height of the protrusion 12 along the rotation axis of the lever support member 15, and then the lever 11 may be rotated. Also in this case, the lever 11 protrudes when the opening/closing door 10 is incompletely locked while being closed. By visually confirming this state, the user can recognize easily that the opening/closing door 10 has been incompletely locked.

In the first embodiment, the opening/closing door 10 is provided at the rear of the right side of the video camera 1. The opening/closing door may be provided at any places such as the underside, the left side, and the front side of the video camera 1.

In the first embodiment, the protrusion is formed of semicircles connected via straight lines around the storage part. The present invention is not limited to this configuration. For example, the protrusion may be formed of a plurality of dots in a range where the lever 11 is rotated.

Further, in the first embodiment, the opening/closing door locking device is used for the video camera 1. The present invention is not limited to this application and may be used for various kinds of electronic equipment requiring opening/closing door locking devices having airtightness. For example, the present invention is applicable to a digital still camera, a portable TV, a cellular phone, and so on for underwater use.

The opening/closing door locking device of the present invention enables a user to recognize easily whether the opening/closing door has been locked or not from a storage state of the lever, and is usefully applicable to electronic equipment such as a video camera and a digital still camera for underwater use.

What is claimed is:

1. An opening/closing door locking device for an electronic equipment having an opening/closing door for openably closing an opening of a housing, the opening/closing door comprising:
   a door body capable of closing the opening;
   a locking member that can be engaged with a part of the housing and locks the door body in a closed state by engagement with the part of the housing; and
   a lever that has one end supported by the door body, the lever being linked with the locking member, and the lever being able to switch the locking member between a locking state and an unlocking state by rotating relative to the door body,
   the door body comprising:
   a storage part; and
   a protrusion that protrudes outside the storage part,
   wherein the lever can be stored in the storage part when the locking member is completely placed in the locking state, and the lever cannot be stored in the storage part by coming into contact with the protrusion when the locking member is placed in the locking state incompletely.

2. The opening/closing door locking device for an electronic equipment according to claim 1, wherein the protrusion is formed around the storage part on the door body.

3. The opening/closing door locking device for an electronic equipment according to claim 1, wherein the door body further comprises an operation indication part that is placed behind the lever in a state in which the lever is stored in the storage part, and can be confirmed visually from an outside in a state in which the lever is pulled out, the operation indication part indicating an operation direction of the lever.

4. The opening/closing door locking device for an electronic equipment according to claim 1, wherein the locking member is in the locking state completely when the lever is placed at a first rotational position relative to the door body, the locking member is in the locking state incompletely when the lever is placed at a second rotational position, which is rotated from the first rotational position, relative to the door body.

5. The opening/closing door locking device for an electronic equipment according to claim 4, further comprising a lever support member rotatably provided relative to the door body and fixed with the locking member so as to rotate integrally, the lever is linked with the locking member via the lever support member and the lever rotates relative to the door body via the lever support member.

6. The opening/closing door locking device for an electronic equipment according to claim 1, wherein the lever switches the locking member between the locking state and the unlocking state by rotating relative to the door body after the door body closes the opening.

* * * * *